United States Patent
Cardoletti et al.

(10) Patent No.: US 6,326,760 B1
(45) Date of Patent: Dec. 4, 2001

(54) METHOD AND DEVICE FOR CONTROLLING A SYNCHRONOUS MOTOR WITH PERMANENT MAGNET

(75) Inventors: Laurent Cardoletti, Chemin du Levant D; Yves Perriard, Rue de la Côte, both of (CH)

(73) Assignee: Sarl, Micro-Beam, Neuchatel (CH)

( * ) Notice: Subject to any disclaimer, the term of this patent is extended or adjusted under 35 U.S.C. 154(b) by 0 days.

(21) Appl. No.: 09/529,039

(22) PCT Filed: Oct. 2, 1998

(86) PCT No.: PCT/CH98/00421

§ 371 Date: Apr. 5, 2000

§ 102(e) Date: Apr. 5, 2000

(87) PCT Pub. No.: WO99/18654

PCT Pub. Date: Apr. 15, 1999

(30) Foreign Application Priority Data

Oct. 6, 1997 (FR) .................................................. 97 12575

(51) Int. Cl.[7] ........................................................ H02P 6/16
(52) U.S. Cl. ........................ 318/700; 318/723; 318/724; 318/254; 318/138; 318/439
(58) Field of Search .................................... 318/700, 723, 318/727, 254, 138, 439

(56) References Cited

U.S. PATENT DOCUMENTS

| | | | |
|---|---|---|---|
| 3,885,206 | * 5/1975 | Hort | 318/314 |
| 4,409,534 | * 10/1983 | Bose | 318/811 |
| 5,245,256 | 9/1993 | Cassat et al. | 318/254 |
| 5,345,156 | * 9/1994 | Moreira | 318/254 |
| 5,440,219 | * 8/1995 | Wilkerson | 318/802 |
| 5,569,994 | * 10/1996 | Taylor et al. | 318/700 |
| 5,877,607 | * 3/1999 | Masaki et al. | 318/807 |
| 5,955,860 | * 9/1999 | Taga et al. | 318/700 |

FOREIGN PATENT DOCUMENTS

| | | |
|---|---|---|
| 735 662 | 10/1996 | (EP) . |
| WO 901 0 973 | 9/1990 | (WO) . |

* cited by examiner

*Primary Examiner*—Robert E. Nappi
*Assistant Examiner*—Rita Leykin
(74) *Attorney, Agent, or Firm*—Baker Botts, L.L.P.

(57) ABSTRACT

A method and device for controlling a synchronous permanent magnet motor with at least one phase, a coil and a rotor, wherein the method and device controls the powering of each motor phase, simultaneously measures the voltage of each motor phase, determines the rotor speed and the motor load from the measured voltage; determines a variable frequency from the speed and the load, samples at the variable frequency output signals from the voltage measurement of each phase; determines the rotor position from the sampled signals; and controls the powering of each motor phase as a function of the rotor position. The device is powered from an electric power source and comprises a power bridge powering the motor coil, a unit for controlling the powering of the coil, a circuit for measuring the voltage of each motor phase and means for sampling, at a variable frequency, signals from the measuring circuit.

13 Claims, 6 Drawing Sheets

METHOD AND DEVICE FOR CONTROLLING A SYNCHRONOUS MOTOR WITH PERMANENT MAGNET

The present invention concerns a method for controlling a synchronous motor with a permanent magnet, without a direct sensor, including at least a phase, a coil and a rotor.

The invention also concerns a device for controlling a synchronous motor with a permanent magnet, without a direct sensor, including at least a phase, this device being powered by an electric power source.

Synchronous motors with permanent magnets, such as stepping motors, hybrid motors or direct current motors with no commutators, are currently well known and used to replace direct current motors with a commutator, the latter having a relatively short lifetime because of friction generated on the commutator by the carbon brushes.

In these motors with permanent magnets, an electronic phase switching circuit is necessary to replace the commutator function. Since this type of motor is synchronous, the rotor speed is the same as that of the rotating stator field. By removing the commutator and replacing it with an electronic circuit, the control logic has to know the position of the rotor to be able to perform the switching at the right time. This is usually achieved with Hall effect probes or an optical sensor called a direct sensor.

The presence of this type of sensor involves certain drawbacks. First of all, their cost has a non negligible effect on the cost of the motor. Moreover, the mounting thereof means that a certain volume has to be provided not just for the sensors themselves, but also for the electric connecting wires to pass. They therefore complicate assembly and increase the time thereof. Finally, the reliability of the system is thereby lessened.

The present invention proposes overcoming these drawbacks by removing the direct sensors and using the data given by the motor to perform phase switching. Each motor having a monophase or polyphase winding around the stator creates an induced voltage due to the movement of the rotor magnets. The passages through zero of this induced voltage of the nonpowered phase allow the rotor position to be known precisely and thus the motor to be speed and/or torque controlled.

This feature was used in particular in two inventions disclosed in the European Patent published under No. EP-B-0 449 687 and the European Patent Application published under No. EP-A-0 735 662.

European Patent No. EP-B-0 449 687 discloses a method for controlling a direct current motor with no commutator. More particularly, this method is only applicable to a three-phase bipolar motor. In this method, the power supply of the motor coils is controlled by an inverter, the conduction and extinction of the power supply being controlled by fixed frequency pulse width modulation. The rotor position is determined by detecting the passage through zero of the electromotive force induced in the non-powered motor coil. In order to remove the effect of disturbances which generate false passages through zero of the induced electromotive force, the signal picked up across the terminals of the non-powered coil is sampled in a synchronised manner with the inverter modulation frequency.

A method of this type has several drawbacks. First of all, it applies only to three-phase motors which are also bipolar. It cannot be transferred to other motor types, which limits its possible field of application. Moreover, the use of a fixed frequency as sampling frequency does not provide optimum yield. Finally, a delay is created between the detection of a passage through zero and the switching of the power supply. This delay is fixed, which generates noise.

The European Patent Application published under No. EP-A-0 735 662 describes a circuit and method for powering a direct current polyphase motor with no commutator. The main object of the invention described in this document is to reduce the disturbances generated by the pulse width modulation. As in the preceding case, a fixed switching delay is used, which generates noise.

Furthermore, a method of this type can only apply to bipolar polyphase motors and again uses pulse width modulation.

The present invention proposes overcoming these drawbacks and providing a method and a device for controlling a synchronous motor with a permanent magnet used in motor or generator mode, this motor being able to be monophase, polyphase, unipolar or bipolar, and able to be controlled with or without pulse width modulation.

This object is achieved by a method as defined in the preamble and characterised in that it includes the steps of:

controlling the powering of each motor phase, simultaneously measuring the voltage of each motor phase, determining a variable frequency from the rotor rotational speed and the motor load, sampling at said variable frequency the output signals from the voltage measurement of each phase, and controlling the powering of the phases as a function of the sampled signals.

The motor coil can be powered in a unidirectional or bidirectional manner.

Preferably, the rotor position and speed are determined from the voltage of each motor phase.

According to one embodiment, the rotor rotational speed is determined by introducing the voltage of at least one motor phase into a comparator and measuring the time interval which separates two sign changes in the signals from the comparator.

In an advantageous manner, the motor rotor rotational speed is determined by calculating the sum of the squares of the voltages of each phase and by extracting the square root of this sum.

Preferably, the motor power supply is switched as a function of the number of motor phases, the phase power supply type, the motor type and the operation mode thereof.

According to a preferred embodiment, as a function of the motor rotor position, a single switching type is authorised.

When the time separating two successive powering control actions of each motor phase exceeds a predefined threshold value, the variable frequency used for sampling the output signals from the voltage measurement of each phase is preferably fixed at a predetermined value greater than the maximum rotational frequency of the motor rotor.

According to a preferred embodiment, the real rotational speed of the motor rotor is determined repeatedly, this real rotational speed is compared to a predefined threshold speed, the powering of each motor phase is controlled by momentarily cutting off the powering of each phase when the real speed is less than the threshold speed, and, when the real rotational speed is greater than the threshold speed, the powering of each motor phase is controlled by measuring the voltage induced by the rotor movement over a non-powered phase.

The object of the invention is also achieved by a device implementing the above method characterised in that it includes a power bridge powering the motor coil, a unit for controlling the powering of the coil, a circuit measuring the voltage of each motor phase and means for sampling, at a variable frequency, signals from the measuring circuit.

The device according to the invention advantageously includes a control unit arranged to control the switching of the powering of each of the motor phases, this control unit including at least one control programme depending on the motor type, the number of phases, the type of powering of the phases and the motor operating mode.

The device preferably includes a phase comparator, arranged to measure the sign of the voltage of each phase.

According to a preferred embodiment, the voltage of each phase is introduced into the control unit in the form of analogue signals.

The present invention and the advantages thereof will appear more clearly with reference to the description of an embodiment and the annexed drawings in which.

Figure 1:
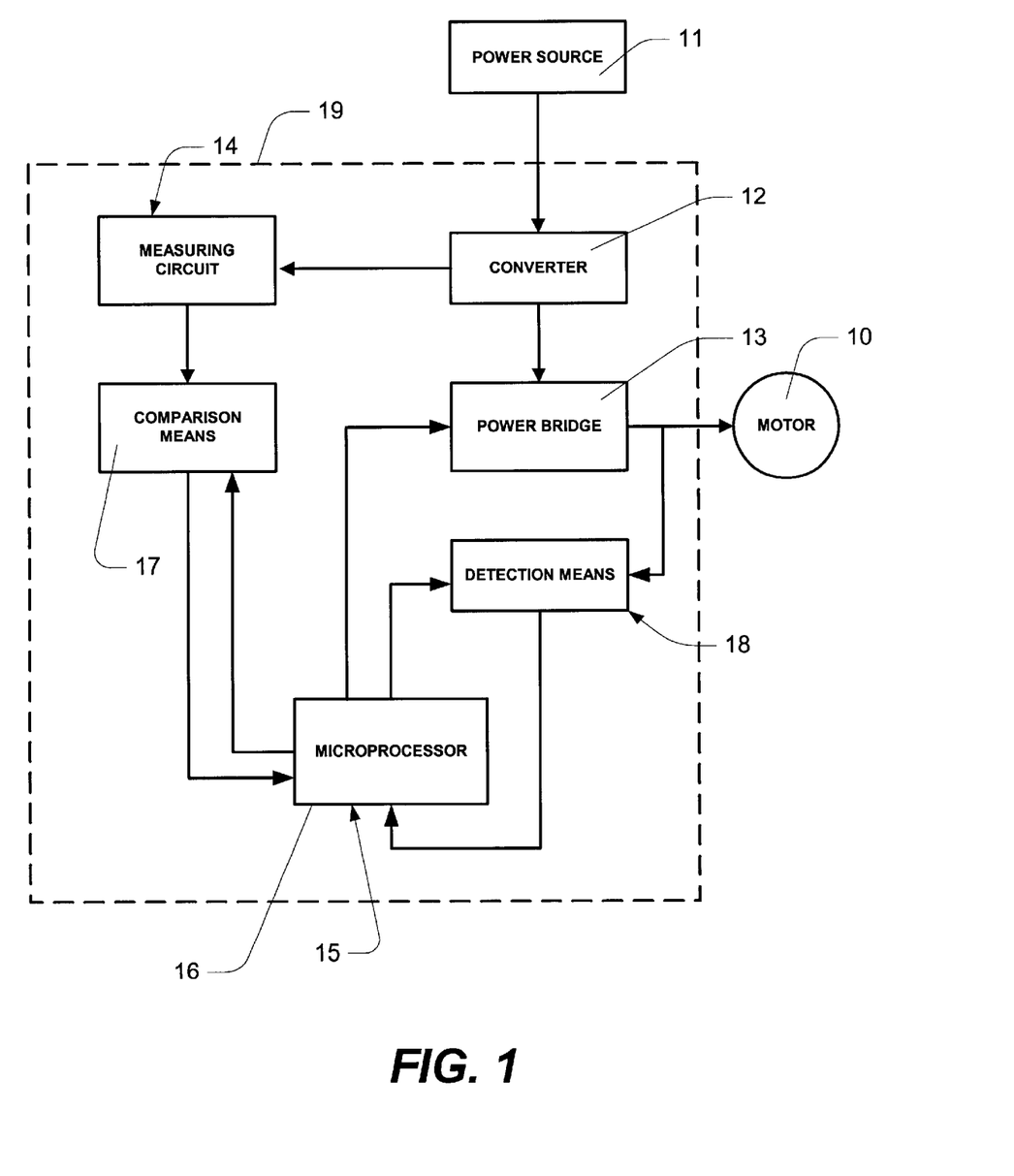
FIG. 1 is a block diagram illustrating the control device according to the present invention.
Figure 2:
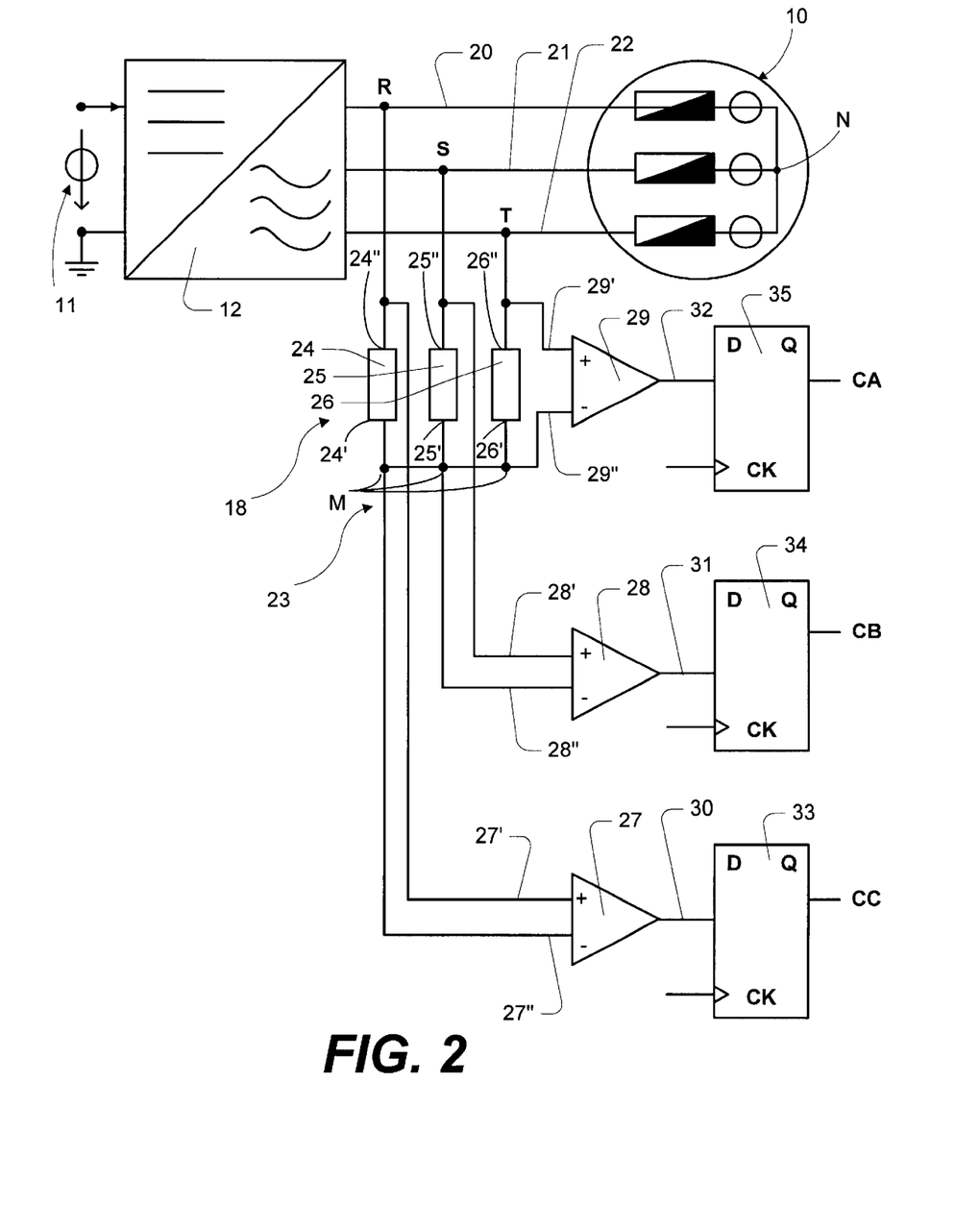
FIG. 2 shows a first embodiment of a part of the device according to the present invention.
Figure 3:
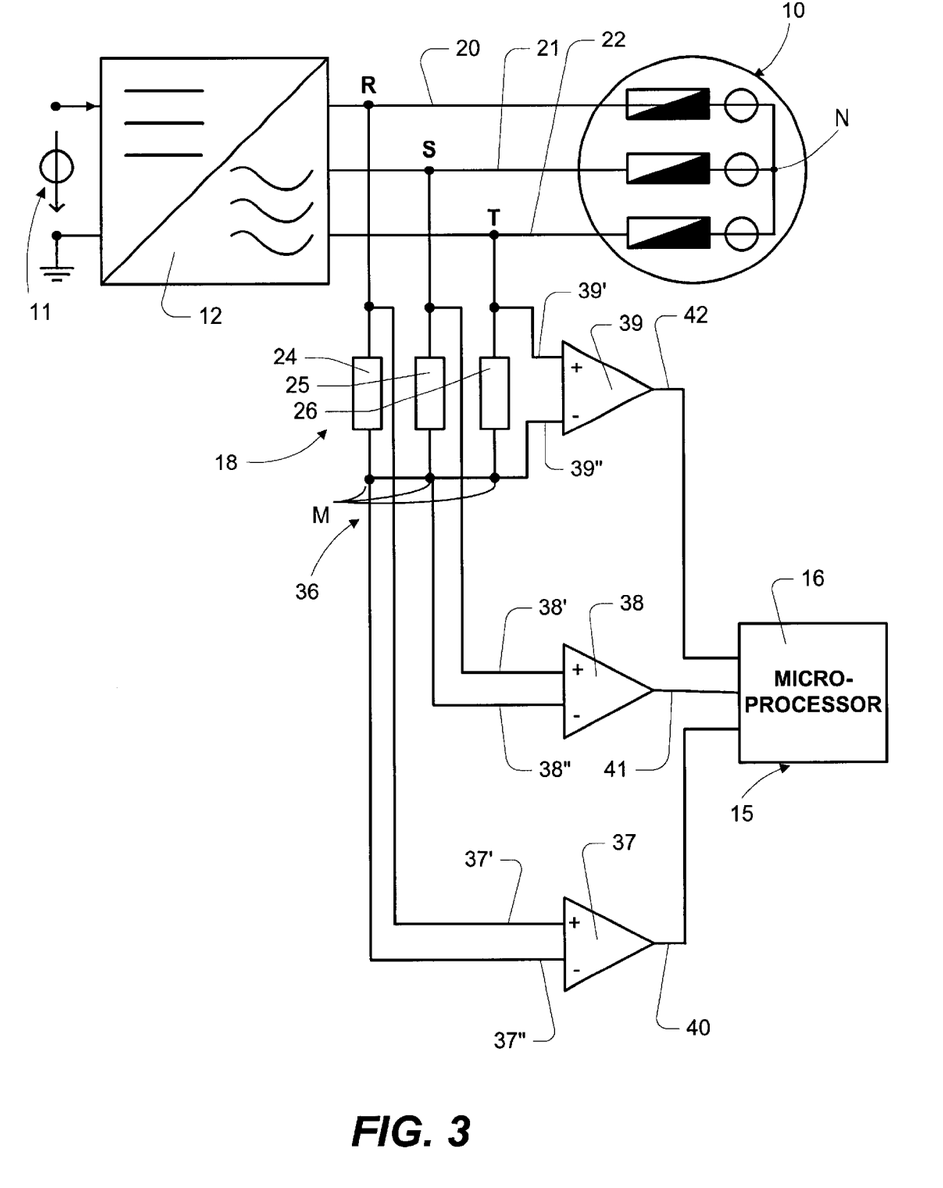
FIG. 3 shows a second embodiment of a part of the device of FIG. 2.

With reference to FIGS. 1 to 3, the device according to the present invention is used to power a synchronous motor with a permanent magnet 10 such as, for example, a three-phase motor, and it includes an electric power source 11, a converter 12, a power bridge 13 allowing the motor to be powered, a circuit 14 measuring the space current of the motor phases, a control unit 15 formed of a microprocessor 16, comparison means 17 allowing an instantaneous value of the motor space current to be compared with a desired value, and detection means 18 determining the real position of the motor rotor as a function of the induced voltage generated by the movement of the motor rotor.

Electric power source 11 can be an a.c. or d.c. source. The current is, on the one hand, supplied to power bridge 13 and, on the other hand, to an electronic board 19 on which all the above components are placed, with the exception of motor 10 and electric power source 11. Prior to being transmitted to the electronic board, the current is converted by converter 12 into a direct current having a given logic voltage.

Power bridge 13 powers each motor phase and thus, with control unit 15, controls the switching on and off of the powering of each phase.

Two embodiments of means 18 for detecting the position of the motor rotor are illustrated in detail in FIGS. 2 and 3.

FIG. 2 shows a first embodiment of these detection means 18, used in particular in high speed mode, i.e. when the rotational speed of the motor rotor is greater than approximately 10% of its maximum rotational speed.

In the embodiment shown, motor 10 includes three phases, respectively 20, 21 and 22. Each phase is directly powered by the current from power bridge 13. If the motor has an accessible neutral point N, the voltage of each phase can be measured directly between the neutral point and the phase. However, the neutral point is generally not accessible. In such case, a voltage measuring circuit 23 is set in place. This circuit includes resistors 24, 25 and 26 of high ohmic value, having terminals 24', 25' and 26' connected to each other and terminals 24", 25" and 26" respectively connected to phases 20, 21 and 22 of the motor.

In the case illustrated in FIG. 2, since the motor is three-phase, voltage measuring circuit 23 includes three resistors connected to a common point M. This voltage measuring circuit includes three comparators 27, 28 and 29 each having two inputs, respectively 27'–27", 28'–28", 29'–29", and an output 30, 31 and 32. One of these inputs 27", 28" and 29" of each comparator is connected to point M, and the other input of each comparator is connected to one of phases 20, 21 and 22. Each comparator thus supplies an output signal representative of the voltage sign of each phase.

In order to avoid interference, each signal from comparators 27, 28 and 28 is stored in the memory by means of a flip-flop 33, 34 and 35. The flip-flops are controlled according to a sampling frequency which varies as a function of the motor's rotational speed and load, as will be explained in detail hereinafter. Each flip-flop generates an output signal CA, CB, CC which is transmitted to control unit 15.

In the event that the motor is used at low speed, i.e. when the real rotational speed of the motor is less than approximately 10% of its maximum speed, the voltage induced by the rotation of the motor rotor becomes very low. The amplitude of the signals measured across the terminals of resistors 24, 25 and 26 is low and the comparators make too many errors for the signals to be able to be used.

FIG. 3 illustrates a voltage measuring circuit example 36 which can be used when the motor rotates at a low speed. In fact, compared to the circuit of FIG. 2, this measuring circuit does not include any flip-flops and the comparators are replaced by operational amplifiers 37, 38 and 39. Each amplifier includes two inputs 37'–37", 38'–38", 39'–39" and an output 40, 41 and 42 and is connected in the same way as the comparators of circuit 23 of FIG. 2. The output signals from these operational amplifiers are thus not only representative of the voltage sign over each phase, but also of the amplitude thereof. These signals are directly transmitted to control unit 15 in which they are processed. The control unit reads the operational amplifier signals by sampling them at a very low frequency.

In order to allow precise measurement of the voltage induced by the movement of the motor rotor in low speed mode, the powering of all the phases is momentarily cut off. During this cut off period, the induced voltage is measured, which allows the speed and position of the rotor to be detected. The power supply is then reestablished.

In practice, control unit 15 advantageously includes twice as many inputs as the motor includes phases. In the case illustrated, since the motor includes three phases, control unit 15 includes six inputs and the voltage measuring circuit includes three comparators and three amplifiers. In high speed mode, the signals from comparators 27, 28 and 29 are used by the control unit to determine the rotor position. In low speed mode, the signals from operational amplifiers 37, 38 and 39 are used. The signals from the comparators and the amplifiers are continuously transmitted to the inputs of the control unit. The control unit determines the signals which will be used as a function of the rotational speed of the motor.

It is clear that, when the circuit includes more or less than three phases, it has to be adapted as a function of this number of phases.

It is to be noted that the circuit as illustrated in FIG. 2 can also be used in low speed mode. In this case, the operational amplifiers are not necessary and the control unit can include only digital inputs.

Figure 4:
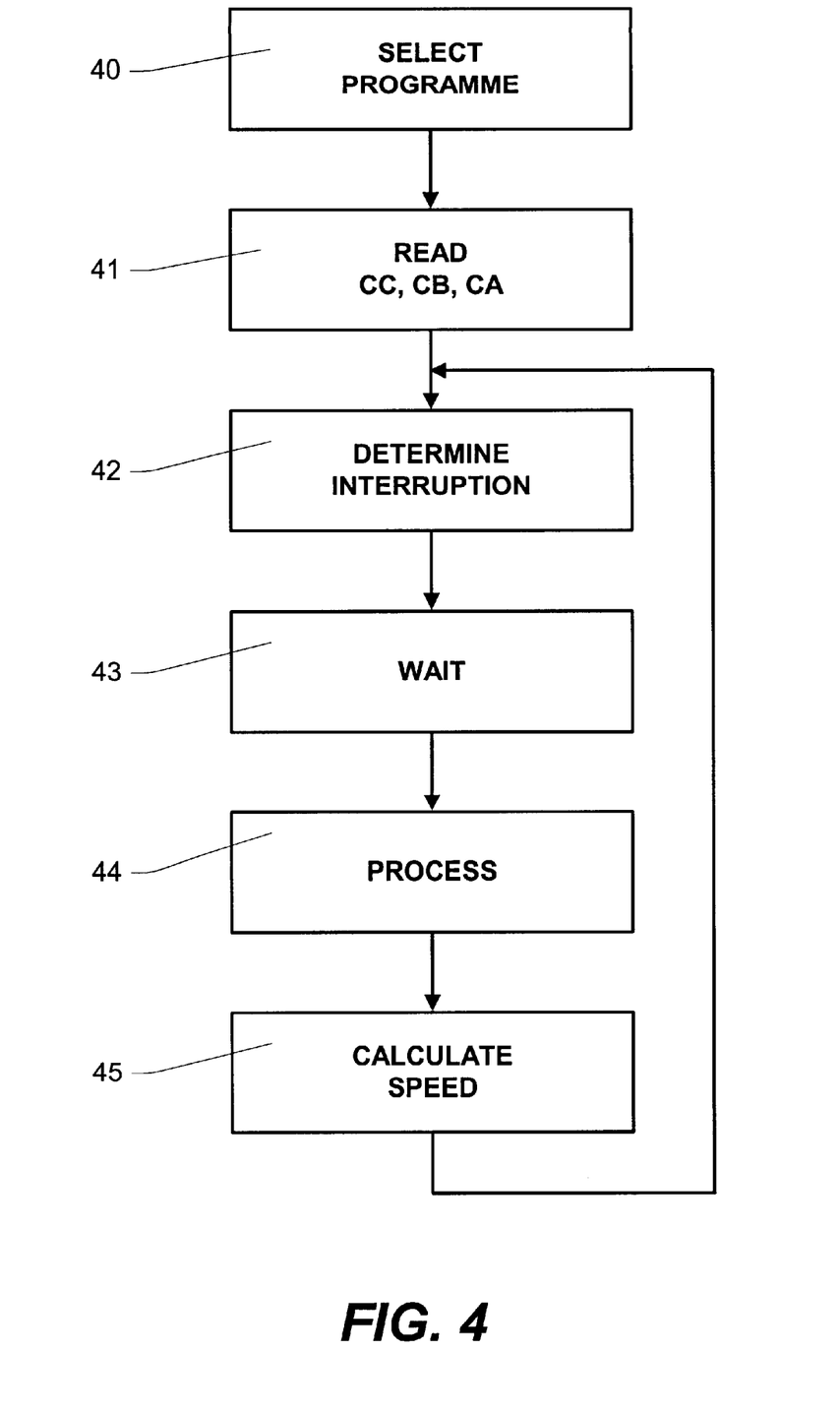
FIG. 4 shows, in the form of a block diagram, the switching method in high speed mode.

The high speed mode operating principle without using pulse width modulation is described hereinafter with reference to FIGS. 2 and 4.

The switching method is based on the principle of interruptions. Indeed, microprocessor 16 is provided with inputs, called <<interruptions>>, which trigger a programmed process. The microprocessor contains several programmes. The first step 40 of the programme consists in selecting, from all the available programmes, the suitable programme. The latter depends on the motor or generator operating mode, the number of phases, the rotational direction and the unipolar or bipolar powering type of the motor.

The second step 41 of the method consists in reading signals CC, CB, CA from flip-flops 33, 34 and 35. As a function of the programme used, the last signal CC, CB or CA to have changed state and the direction of the change of state, the microprocessor determines, in a step 42, which is the next authorised interruption.

A waiting time, between the moment when the passage through zero of the induced voltage is detected and when the powering of the phases is switched, is introduced. This waiting time varies as a function of the rotational speed of the rotor. This operation corresponds to step 43.

When the signal linked to the next authorised interruption occurs, the programmed process actually takes place. This corresponds to step 44.

The speed of the motor rotor is calculated in step 45. The way in which this speed is calculated will be described in detail hereinafter.

The programme returns finally to step 42 which determines the next authorised interruption.

In the case of a bipolar three-phase motor, for a given rotational direction, the three signals CA, CB and CC are connected to three interruptions I1, I2 and I3 of the microprocessor. As in the case of a direct sensor, such as Hall effect probes, the following steps are performed:

1. On the leading edge of CA, interruption I1 is made.
2. On the trailing edge of CC, interruption I3 is made.
3. On the leading edge of CB, interruption I2 is made.
4. On the trailing edge of CA, interruption I1 is made.
5. On the leading edge of CC, interruption I3 is made.
6. On the trailing edge of CB, interruption I2 is made.
7. Return to point 1.

1. Interruption I1 is activated on the leading edge of CA. The phase switching is then performed during the interruption and the possible interference of CC, due to the current extinction in phase 22 and to the phase 22 voltage inversion is prevented. At the end of this operation, the activation of interruption I3 is authorised as soon as the trailing edge of CC appears.

2. Interruption I3 is activated on the trailing edge of CC. The phase switching is performed during this interruption and possible interference due to CB is prevented. At the end of this operation, the activation of interruption I2 is authorised as soon as the leading edge of CB appears.

3. Interruption I2 is activated on the leading edge of CB. The phase switching is performed during this interruption and possible interference due to CA is prevented. At the end of this operation, the activation of interruption I1 is authorised as soon as the trailing edge of CA appears.

4. Interruption I1 is activated on the trailing edge of CA. The phase switching is performed during this interruption and possible interference due to CC is prevented. At the end of this operation, the activation of interruption I3 is authorised as soon as the leading edge of CC appears.

5. Interruption I2 is activated on the leading edge of CC. The phase switching is performed during this interruption and possible interference due to CB is prevented. At the end of this operation, the activation of interruption I2 is authorised as soon as the trailing edge of CB appears.

6. Interruption I1 is activated on the trailing edge of CB. The phase switching is performed during this interruption and possible interference due to CA is prevented. At the end of this operation, the activation of interruption I1 is authorised as soon as the leading edge of CA appears.

As a result of this method, only one interruption is authorised. The passages through zero due to the diode conduction of the power bridge does not therefore disturb switching.

By using pulse width modulation, at each extinction of the modulation signal, interference is generated. The effect of this interference is removed in the following way. The output signal of each of flip-flops 33, 34 and 35 illustrated in FIG. 2 is equal to the signal from the voltage measurement across the terminals of resistors 24, 25 and 26 when a clock signal reaches the flip-flop. The generation of this clock signal at the right moment removes disturbance due to interruptions in the modulation signal.

Each time that power bridge 13 is switched on, a signal is transmitted to a one-shot flip-flop (not shown). The period of time during which this one-shot flip-flop gives a high signal is regulated in a conventional manner by means of an RC filter. The clock signal transmitted to the flip-flops is given by each trailing edge of the signal from the one-shot flip-flop. The sampling frequency, given by the frequency of the clock signal transmitted to the flip-flops is equal to the pulse width modulation frequency which varies as a function of the rotational speed and load of the motor.

In high speed and low speed mode, if the period of time between two successive applications of power to the power bridge increases too significantly, the sampling frequency becomes too low and the motor rotor position can no longer be detected in a reliable manner. In such case, an external frequency is used to inhibit the clock signal from the one-shot flip-flops. This external frequency is greater than the maximum rotational frequency of the rotor. It is generally at least five times greater than the maximum rotational frequency and, in the example described, it may be equal to 100 Khz. This frequency is determined empirically.

Figure 5:
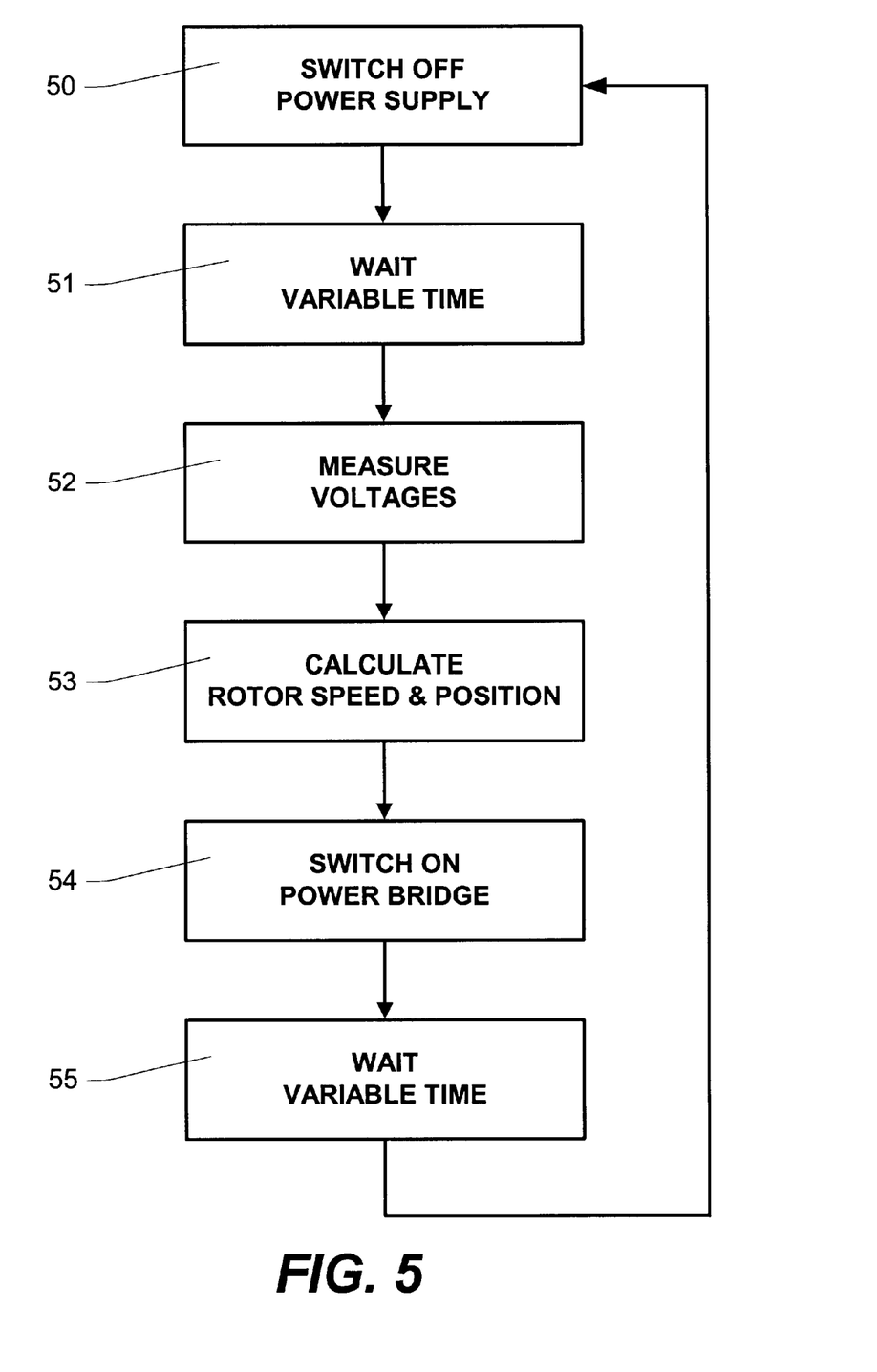
FIG. 5 shows, in the form of a block diagram, the switching method in low speed mode.

The low speed mode operating principle is described hereinafter with reference to FIG. 5.

The power bridge power supply is switched off, which means that in step 50, none of the phases is powered. In step 51 of the method, a variable waiting time is introduced so that the phase currents counterbalance each other. The control unit measures the voltages induced by the rotor movement over each of the phases. This is measured in step 52 of the method. Using these induced voltages, the rotor speed and position are calculated. The way in which the rotor speed is calculated is explained hereinafter. These calculations are effected in step 53 of the method. As a function of these values, switching is performed and the power bridge is switched on again to power the desired phases. This corresponds to step 54 of the method. Finally, in step 55, a variable waiting time is imposed, depending on the rotational speed of the motor rotor, between the end of the speed measurement and the moment at which the powering is switched.

When the digital signals from flip-flops 33, 34 and 35 are used, the time which elapses between the appearance of two edges is measured. It is possible to detect edges on any of signals CA, CB or CC, so that the time between the appearance of two edges on the same signal or two different signals can be measured. This time allows the time necessary for the rotor to perform an electric period to be determined and, consequently, the rotational speed of the motor rotor. This corresponds to step 44 of the method illustrated in FIG. 4.

When the analogue signals from operational amplifiers 37, 38, 39 are used to measure the rotational speed of the motor, the sum of the squares of the voltages over each phase is calculated and the square root of this sum is extracted. This gives the voltage amplitude, which is directly proportional to the rotational speed of the motor. It is thus possible to know the rotational speed of the motor rotor in low speed mode. This corresponds to step 53 of the method illustrated in FIG. 5. It is to be noted that this calculating mode can be used in particular when the motor includes two or three phases. In other embodiments, the rotational speed of the motor can be calculated by using other mathematical functions.

Figure 6:
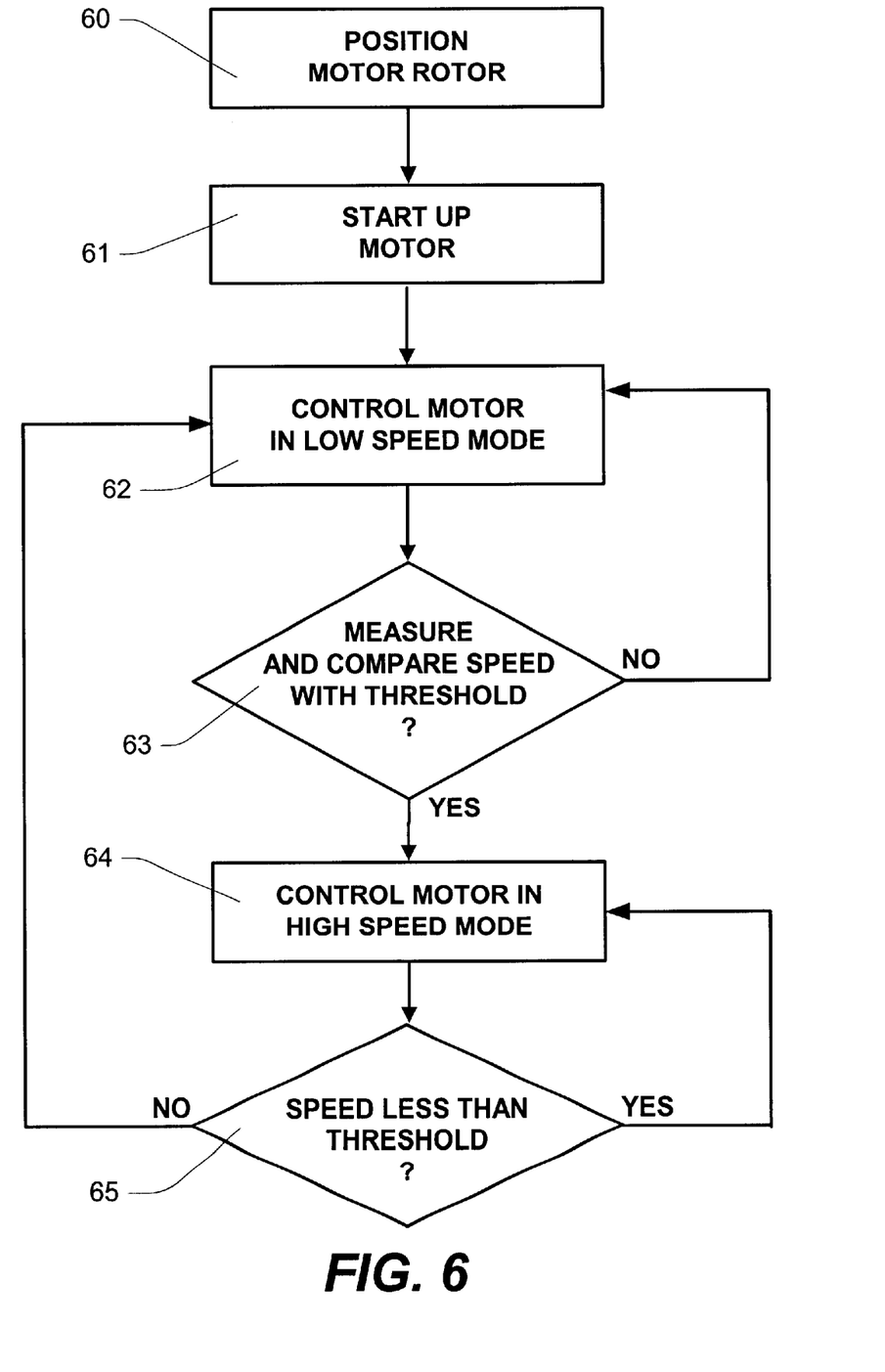
FIG. 6 is a block diagram illustrating the operation of the motor from the starting thereof until it has reached the desired speed.

The control method according to the present invention is explained hereinafter with reference to FIG. 6.

When the motor is switched on, a desired current is introduced into control unit 15. This desired current, on the one hand fixes the torque generated by the motor, and on the other hand protects the motor against a current value which could damage it. The motor rotor is then positioned so that it is not placed in an unstable position. This is done in step 60 of the method illustrated in FIG. 6. In practice, at least one of the motor phases is powered so as to position the rotor properly. The motor is then started up in step 61 of the method until the voltage induced by the rotor movement is sufficient to be detected.

At the end of this start up phase, the motor is controlled in low speed mode, as was described above. This step corresponds to step 62 of the method. In step 63 of the method, the rotational speed of the motor is measured and compared to a threshold speed, corresponding to the limit between the low speed mode and the high speed mode. This threshold is generally close to 10% of the maximum rotational speed of the motor. As soon as the real rotational speed of the motor has exceeded the threshold value, the motor is controlled in high speed mode, as described above. This corresponds to step 64 of the method. In the contrary case, it is controlled in low speed mode.

The rotor rotational speed measurement is regularly compared to the threshold speed in step 65 of the method. If the rotor speed is less than the threshold speed, the motor is controlled in low speed mode. In the contrary case, it is controlled in high speed mode.

The control of the motor in high speed mode or low speed mode may be achieved with or without pulse width modulation.

The regulating method and device according to the present invention allow regulation of monophase or polyphase, unipolar or multipolar motors, with or without amplitude regulation modulation, without using direct sensors, in motor or generator mode.

Furthermore, by using variable frequency pulse width modulation, a better yield is obtained for the electric drive.

The present invention is not limited to the embodiments described, but extends to any variants obvious to those skilled in the art. In particular, the type of motor which can be used is diverse. It is possible to introduce different desired values, such as the torque, speed, current or voltage.

What is claimed is:

1. A method for controlling a synchronous permanent magnet motor with at least one phase, a coil and a rotor, comprising the steps of:
    controlling the powering of each motor phase;
    simultaneously measuring the voltage of each motor phase;
    determining a rotor speed and a motor load from said measured voltage;
    determining a variable frequency from said speed and said load;
    sampling at said variable frequency output signals from the voltage measurement of each phase;
    determining the rotor position from the sampled signals; and
    controlling the powering of each motor phase as a function of the rotor position.

2. Method according to claim 1, wherein said coil is powered in a unidirectional manner.

3. Method according to claim 1, wherein said coil is powered in a bi-directional manner.

4. Method according to claim 1, wherein the rotor rotational speed is determined by introducing the voltage of at least one motor phase into a comparator (33, 34, 35) and by measuring the time interval which separates two sign changes in the signals from said comparator.

5. Method according to claim 1, wherein the rotor rotational speed is determined by calculating the sum of the squares of the voltages of each phase and by extracting the square root of this sum.

6. Method according to claim 1, wherein the powering of the motor is switched as a function of the number of motor phases, the phase powering type, the motor type and the operating mode thereof.

7. Method according to claim 6, wherein as a function of the rotor position, only one type of switching is authorized.

8. Method according to claim 1, wherein, when the time separating two successive actions for controlling the powering of each motor phase exceeds a predefined threshold value, the variable sampling frequency is fixed at a predetermined value greater than the maximum rotational speed of the rotor.

9. Method according to claim 1, further comprising the steps of:
    repeatedly determining the real rotational speed of the rotor;
    comparing this real rotational speed to a predefined threshold value;
    controlling the powering of each motor phase by momentarily cutting it off when the real speed is less than the threshold speed;
    controlling the powering of each motor phase by measuring the voltage induced by the rotor movement over a non-powered phase, when the real speed is greater than the threshold speed.

10. Device for controlling a synchronous permanent magnet motor with at least one phase, a coil and a rotor, wherein the device controls: (a) the powering of each motor phase, (b) simultaneously measures the voltage of each motor phase, (c) determines the rotor speed and the motor load from said measured voltage; (d) determines a variable frequency from said speed and said load, (e) samples at said variable frequency output signals from the voltage measurement of each phase; (f) determines the rotor position from the sampled signals; and (g) controls the powering of each motor phase as a function of the rotor position, wherein said device is powered by an electric power source, wherein said device comprises: a power bridge (13) powering the motor coil, a unit for controlling the powering of the coil, a circuit for measuring the voltage of each motor phase and means for sampling, at a variable frequency, signals from said measuring circuit.

11. Device according to claim 10, further comprising a control unit arranged to control the switching of the powering of each motor phase, and wherein this control unit includes at least one control program depending on the motor type, the number of phases, the phase powering type and the motor operating mode.

12. Device according to claim 10, further comprising a phase comparator arranged for measuring the sign of each phase.

13. Device according to claim 10, wherein the voltage of each phase is introduced into the control unit in the form of analogue signals.

* * * * *